United States Patent
Pal et al.

(10) Patent No.: US 12,016,070 B2
(45) Date of Patent: *Jun. 18, 2024

(54) EFFICIENT EVOLVED PACKET SYSTEM (EPS) FALLBACK

(71) Applicant: T-Mobile USA, Inc., Bellevue, WA (US)

(72) Inventors: Rahul Pal, Bellevue, WA (US); Suresh Thanneeru, Redmond, WA (US); Salvador Mendoza, Issaquah, WA (US); Karunakalage Viraj Rakitha Silva, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,750

(22) Filed: Nov. 14, 2022

(65) Prior Publication Data

US 2023/0075268 A1 Mar. 9, 2023

Related U.S. Application Data

(63) Continuation of application No. 16/376,809, filed on Apr. 5, 2019, now Pat. No. 11,510,267.

(51) Int. Cl.
*H04W 76/18* (2018.01)
*H04L 12/66* (2006.01)
(Continued)

(52) U.S. Cl.
CPC .............. *H04W 76/18* (2018.02); *H04L 12/66* (2013.01); *H04L 47/20* (2013.01); *H04W 8/02* (2013.01); *H04L 65/1016* (2013.01)

(58) Field of Classification Search
CPC ..... H04L 12/66; H04L 47/20; H04L 65/1016; H04L 65/1033; H04L 65/1069
See application file for complete search history.

(56) References Cited

U.S. PATENT DOCUMENTS

| 2015/0078245 | A1 | 3/2015 | Anchan |
| 2019/0191349 | A1* | 6/2019 | Kim .................. H04W 76/18 |

(Continued)

FOREIGN PATENT DOCUMENTS

| CN | 102075494 A | * | 5/2011 |
| CN | 102075494 A | | 5/2011 |

(Continued)

OTHER PUBLICATIONS

3rd Generation Partnership Project, "Technical Specification Group Services and System Aspects; Procedures for the 5G System; Stage 2 (Release 16)", retrieved on Apr. 1, 2019 at <<http://www.3gpp.org/ftp/tsg%5Fsa/WG2%5FArch/Latest%5FSA2%5FSpecs/DRAFT%5FINTERIM/Archive/23502%2Dg02%5FMCC%5FCorrections%2Ezip>>, vol. SA WG2, 23502-G02 MCC_Corrections, 3rd Generation Partnership Project (3GPP), Mobile Competence Centre, France, 419 pages.

(Continued)

*Primary Examiner* — Zhensheng Zhang
(74) *Attorney, Agent, or Firm* — Lee & Hayes P.C.

(57) ABSTRACT

Systems, devices, and techniques described herein relate to efficient Evolved Packet System (EPS) fallback. A method may include receiving a rejection message that indicates a rejection to set up a call through a 5th Generation (5G) network by a 5G Radio Access Network (RAN). In response to receiving the rejection message, the method may include transmitting a request to establish a dedicated bearer through a 4th Generation (4G) network. A confirmation that the second dedicated bearer has been established through the 4G network may be received within a predetermined time after transmitting the request.

20 Claims, 7 Drawing Sheets

(51) Int. Cl.
  *H04L 47/20* (2022.01)
  *H04W 8/02* (2009.01)
  *H04L 65/1016* (2022.01)

(56) References Cited

U.S. PATENT DOCUMENTS

2019/0335365 A1  10/2019  Ying et al.
2020/0323008 A1  10/2020  Pal et al.

FOREIGN PATENT DOCUMENTS

| CN | 109246792 | 1/2019 |
| CN | 110719613 | 1/2020 |
| CN | 112567711 | 3/2021 |
| WO | WO2019011107 A1 | 1/2019 |
| WO | WO2019075741 | 4/2019 |

OTHER PUBLICATIONS

Extended European Search Report dated Jul. 21, 2020 for European Patent Application No. 20166319.2, 13 pages.

ETSI, "Speech and multimedia Transmission Quality ( STQ); IMS/PES/VoLTE exchange performance requirements" ETSI TS 101 563 V1.4.1, 2015, pp. 1-28.

Motorola Mobility, "Support of EPS Fallback for voice without impacting IMS", retrieved on May 28, 18 at <<http://www.3gpp.org/ftp/tsg%5Fsa/WG2%5FArch/TSGS2%5F127BIS%5FNewport%5FBeach/Docs/S2%2D185409%2Ezip>>, vol. SA WG2, S2-185409_Disc Paper EPS Fallback-V04, 3rd Generation Partnership Project (3GPP), 8 pages.

Nokia, "Correcting AMF Behaviour for Service Request that is not integrity protected", retrieved on Apr. 2, 2019 at <<http://www.3gpp.org/ftp/tsg%5Fsa/WG2%5FArch/TSGS2%5F132%5FXiAn/Docs/S2%2D1903668%2Ezip>>, vol. SA WG2, No. Xi'an, PRC; Apr. 8, 2019-Apr. 12, 2019, S2-1903668-Servicerequest-R16-Mirror, 3rd Generation Partnership Project, 150 pages.

Office Action for U.S. Appl. No. 16/376,809, dated Jul. 13, 2020, Pal, "Efficient Evolved Packet System (EPS) Fallback", 9 Pages.

Office Action for U.S. Appl. No. 16/376,809, dated Oct. 7, 2021, Pal, "Efficient Evolved Packet System (EPS) Fallback", 17 pages.

Office Action for U.S. Appl. No. 16/376,809, dated Mar. 9, 2022, Pal, "Efficient Evolved Packet System (EPS) Fallback", 18 pages.

Office Action for U.S. Appl. No. 16/376,809, dated Apr. 9, 2021, Pal, "Efficient Evolved Packet System (EPS) Fallback", 11 pages.

* cited by examiner

EFFICIENT EVOLVED PACKET SYSTEM (EPS) FALLBACK

RELATED APPLICATIONS

This application is a continuation of and claims priority to U.S. patent application Ser. No. 16/376,809, filed Apr. 5, 2019, titled "Efficient Evolved Packet System (EPS) Fallback," the entirety of which is incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
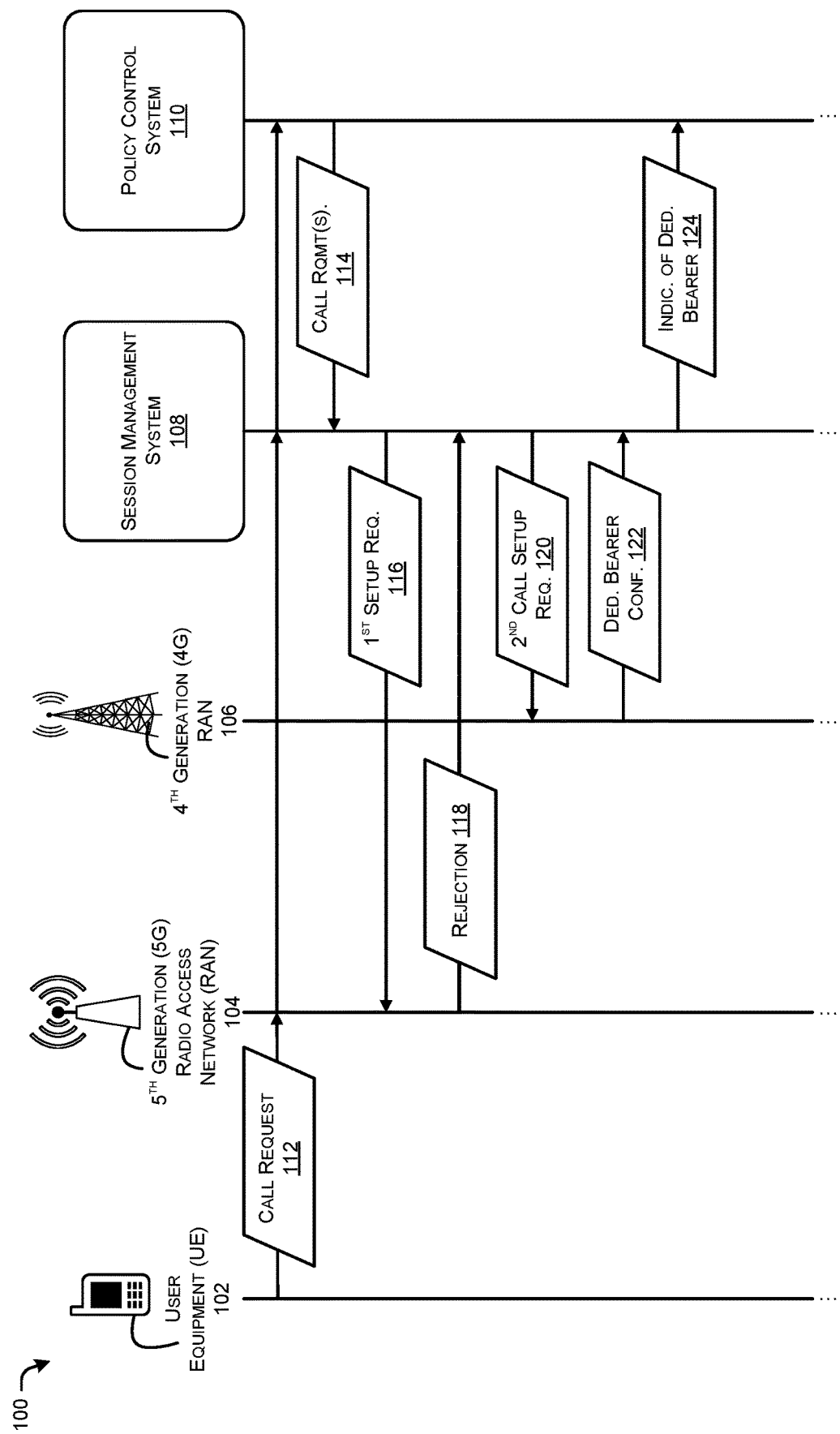
FIGS. 1 and 2 are diagrams illustrating example signaling between a User Equipment (UE) and various components of one or more mobile networks, such as a 4th Generation (4G) mobile network and a 5th Generation (5G) mobile network, as described herein.

The systems, devices, and techniques described herein relate to efficient Evolved Packet System (EPS) fallback. In particular, implementations can relate to efficient EPS fallback in response to a request for voice services, when a 5th Generation (5G) Radio Access Network (RAN) is incapable of providing the voice services.

With the development of 5G telecommunications technology, 5G network systems that support a broad variety of services may be developed and deployed. However, during an initial deployment, some services may not be immediately supported by particular 5G systems. In some examples, a 5G RAN may be capable of providing some services to a User Equipment (UE), but be incapable of providing other services to the UE. For instance, a 5G RAN may be capable of providing data services but incapable of providing voice services to the UE, because it may lack functionality to establish a particular type of bearer (e.g., a dedicated bearer), a particular type of flow (e.g., a Guaranteed Bitrate (GBR) Flow), or a particular type of Protocol Data Unit (PDU) session required to accommodate the voice services. In some cases, the 5G RAN may lack software that would allow the 5G RAN to accommodate the voice services, even though the 5G RAN may be installed with software that allows the 5G RAN to deliver services via a default, type of Protocol Data Unit (PDU) session.

It may be advantageous for the UE to receive 5G services wherever possible, even if the 5G RAN is incapable of providing other types of services to the UE. In some instances, the unsupported services can be selectively provided by a 4G network system that can connect to the UE, such as a network system including an Evolved Packet System (EPS).

The term "EPS fallback," "4G fallback," and their equivalents, as used herein, can refer to a process by which a 5G network system connected to a UE can cause an EPS to provide services to the UE. The services may be of a type that is unsupported by the 5G network system, in some cases.

Various implementations of the present disclosure provide mechanisms for efficient EPS fallback. In various implementations, a session management system handles the EPS fallback. In some implementations the session management system can include a Session Management Function (SMF) of a 5G network and a Packet Data Network (PDN) Gateway (PGW) of a 4G network that are collocated on the same one or more devices. In cases in which the 4G network utilizes a Control and User Plane Separation (CUPS) architecture, the session management system can include a PGW Control plane function (PGW-C), and may exclude a PGW User plane function (PGW-U).

A UE capable of connecting to both a 4G network and a 5G network may be an originating or terminating node in a communication session. In some cases, the UE may transmit, to the 5G network, a request for the UE to be provided voice services. In certain cases, another device may transmit the request to the 5G network.

In response to receiving the request, the 5G network may attempt to set up a bearer or PDU session through the 5G network by which the voice services can be provided to the UE. In some cases, the session management system may transmit a request to establish the bearer or PDU session to one or more nodes in the 5G network. However, at least one of the nodes may be incapable of accommodating the requested voice services. In some examples, a Radio Access Network (RAN) in the 5G network may be incapable of delivering the voice services. For instance, the 5G RAN may lack hardware and/or software functionality that would enable the 5G RAN to establish a specific type of bearer (e.g., dedicated bearer), a GBR Flow, or a specific type of PDU session required to deliver the voice services. Accordingly, the session management system may receive an indication that the 5G network cannot deliver requested voice services.

The session management system may hold onto the indication, rather than forwarding it immediately to other nodes within the 5G network. For example, by refraining from forwarding the indication to a Policy Control Function (PCF) in the 5G network, failure of the communication session can be prevented.

In addition, the session management system may transmit a request to establish a dedicated bearer through the 4G network. As a result of the request, the 4G network may establish the dedicated bearer through the 4G network, which can carry voice services to and from the UE. The session management system may receive, from one or more nodes in the 4G network, a confirmation that the dedicated bearer has been at least partly established. Once the dedicated bearer has been established in the 4G network, the session management system can facilitate the delivery of the requested services to the UE via the dedicated bearer.

Further, the session management system may track a time that has elapsed since the session management system transmitted the request to establish the dedicated bearer through the 4G network. In particular implementations, when the session management system has not received the confirmation that the dedicated bearer through the 4G network has been at least partly established within a predetermined time of transmitting the request to establish the dedicated bearer through the 4G network, the session management system can forward the indication (that the 5G network cannot deliver the voice services) to the PCF in the 5G network, thereby causing failure of the communication session. These implementations can prevent call setup from occurring indefinitely when there is some problem (e.g., an outage) in the 4G network that interferes with the establishment of the dedicated bearer.

Various implementations represent improvements to the field of telecommunications networks. In particular, various implementations enable efficient EPS fallback when requested services (e.g., voice services) cannot be provided through a 5G network via one or more call requirements. By refraining from informing the PCF that the 5G network cannot accommodate the requested services, call failure can be prevented. Furthermore, by selectively informing the PCF that the 5G network cannot accommodate the requested services after attempting to establish a dedicated bearer through the 4G network, various implementations prevent call setup from extending indefinitely when the 4G network is malfunctioning or is otherwise unable to establish the dedicated bearer.

The various functions, gateways, nodes, and components discussed herein can be implemented either as a network element on a dedicated hardware, as a software instance running on a dedicated hardware, or as a virtualized function instantiated on an appropriate platform, such as a cloud infrastructure.

The systems, devices, and techniques described herein can be applied to various implementations of efficient EPS fallback. In certain instances, various components of a 4th Generation (4G) mobile network can include, but are not limited to, a Mobility Management Entity (MME), a Serving Gateway (SGW), a Packet Data Network (PDN) Gateway (PGW), a Home Subscriber Server (HSS), an Access Network Discovery and Selection Function (ANDSF), and/or an evolved Packet Data Gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C).

In some examples, various components of a 5th Generation (5G) mobile network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can perform efficient EPS fallback. Thus, the system, devices, and techniques broadly apply to efficient EPS fallback, and are not limited to a particular context or function, as discussed herein.

As used herein, the terms "communication session," "session," and their equivalents, can refer to an exchange of data between two or more communicating nodes or devices. A call (e.g., a voice call, a video call, or the like) may be an example of a communication session. A communication session can be temporary, such that it is established at a first time and ceased at a second time. In various implementations, a communication session includes the transfer of user plane data between two or more nodes.

As used herein, the term "node," and its equivalents, can refer to one or more devices that transmit and/or receive data in a network. In some instances, a first node can transmit and/or receive data from a second node.

As used herein, the terms "network path, "path," and their equivalents, can refer to a pathway over which data can be transferred between at least two terminal nodes or devices. In some cases, a path may include one or more intermediary nodes and/or one or more interfaces between the terminal nodes.

The term "dedicated bearer," and its equivalents, as used herein, can refer to a means to deliver data between two or more nodes of a network that is associated with one or more minimum Quality of Service (QoS) requirements (e.g., a Guaranteed Bit Rate (GBR), a priority level, a packet delay budget, a packet error loss rate, etc.). In some examples, the dedicated bearer may traverse one or more intermediary nodes in the network that carry the data according to the one or more minimum QoS requirements.

The systems, devices, and techniques described herein can be implemented in a number of ways. Example implementations are provided below with reference to the following figures.

FIG. 1 is a diagram illustrating example signaling 100 between a User Equipment (UE) 102 and various components of one or more mobile networks, such as a 4th Generation (4G) mobile network and a 5th Generation (5G) mobile network, as described herein.

In accordance with various embodiments described herein, the terms "UE," "user device," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

The UE 102 is configured to utilize various RANs, such as a 5G RAN 104 and/or a 4G RAN 106, in order to access an external network (not pictured), receive downlink data from the external network, and/or transmit uplink data to the external network. The external network can include one or more Wide Area Networks (WANs). In general, the external network is agnostic to the access technology that is used to connect a UE to the external network. In this manner, the 5G RAN 104 and/or the 4G RAN 106 can include and/or be substituted for a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. In some instances, the 5G RAN 104 and/or the 4G RAN 106 can include a Wi-Fi Access Point (AP). Providing access to the external network through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage.

In general, a user can further utilize the UE 102 to communicate with other users and associated UEs via an Internet Protocol (IP) Multimedia Subsystem (IMS) core (sometimes referred to as the "IMS core network," the "IMS network," the "Core Network (CN)," or the "IM CN Subsystem"), which can be at least a portion of the external network. IMS is an architectural framework defined by the 3$^{rd}$ Generation Partnership Project (3GPP) for delivering Internet Protocol (IP) multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be included in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order for a UE (e.g., the UE 102) to access these services (e.g., telephony services), the UE may be configured to request establishment of a communication session, or another UE may be configured to request establishment of the communication session. In the case of telephony services, the communication session can comprise a call (e.g., a voice-based communication session, such as a VoLTE call, or a Wi-Fi call).

A session management system 108 may be configured to manage a communication session and to handle EPS fallback for the communication session. In various implementations, the session management system 108 can include a Session Management Function (SMF) associated with a 5G network. In general, the SMF can be implemented as a network function including functionality to manage communication sessions by and between UEs, and/or to provide internet protocol (IP) addresses to the UEs. In some instances, the SMF can select a User Plane Function (UPF) to provide services to the UE 102 in response to receiving a request from the UE 102.

In particular implementations, the session management system 108 can include a Packet Data Network (PDN) Gateway Control plane function (PGW-C) associated with a Control and User Plane Separation (CUPS) architecture of a 4G network. In general, the PGW-C can be implemented as a software node that handles control-plane data traffic between the 4G network and one or more external networks (e.g., an IMS network, the Internet, and the like). The PGW-C can, in particular examples, perform policy enforcement functions, charging support functions, interception functions, and the like. In certain implementations, the SMF and the PGW-C can be collocated on the same device or distributed on the same system that includes a set of devices.

A policy control system 110 may be configured to establish a communication session between the UE 102 and one or more external devices. In particular cases, the policy control system 110 may be connected between the session management system 108 and an IMS network. In various implementations, the policy control system 110 can include a Policy Control Function (PCF) of the 5G network. In general, the PCF can be implemented as a network function including functionality to support unified policy framework to govern network behavior, provide policy rules to control plane functions and/or enforce such rules, and/or implement a front end to access subscription information relevant for policy decisions in a data repository.

In certain examples, the policy control system 110 can include a Policy and Charging Rules Function (PCRF) of the 4G network. In general, the PCRF can be implemented as a software node designated to determine and apply policy rules in the 4G network. In some cases, the PCRF accesses one or more subscriber databases and makes policy decisions for subscribers (e.g., UE 102) active on the 4G network. The PCRF can, in some instances, allocate network resources to particular subscribers engaged in communication sessions with particular Quality of Service (QoS) levels and charging rules.

Prior to the signaling 100, the UE 102 may be attached to the 5G RAN 104. In some cases, the UE 102 may be dual-connected to the 5G RAN 104 and the 4G RAN 106. In various implementations, the UE 102 may be located in a coverage area associated with the 5G RAN 104 and a coverage area associated with the 4G RAN 106 and may be capable of receiving and transmitting signals wirelessly with the 5G RAN 104 and the 4G RAN 106.

The UE 102 may transmit a call request 112 to the 5G RAN 104. While FIG. 1 illustrates an example in which UE 102 initiates a call, in some cases, another device initiates the call with the UE 102. In particular implementations, the call request 112 may be packaged in such a way that makes it unrecognizable to the 5G RAN 104. The 5G RAN 104 may forward the call request 112 to the session management system 108 without interpreting or processing the call request 112. The session management system 108 may further forward the call request 112 to the policy control system 110.

The policy control system 110 may inspect the call request 112 and determine one or more QoS policies associated with the call request 112. The QoS policies may include any of a QoS Class Identifier (QCI), a resource type (e.g., recognizing the call as Guaranteed Bit Rate (GBR) traffic or non-GBR traffic), a priority level of the call, a packet delay budget for the call, a packet error loss rate, or any other requirement for the call. The QoS policies may be derived based on the type of services (e.g., voice services, video services, etc.) associated with the call. In some examples, the policy control system 110 may recognize that a dedicated bearer, or a particular type of Protocol Data Unit (PDU) session, should be established for the call in order to accommodate the QoS policies.

The policy control system 110 may transmit one or more call requirements 114 to the session management system 108. The call requirement(s) 114 may specify various QoS requirements for the call.

In response to receiving the call requirement(s) 114, the session management system 108 may transmit a first call setup request 116 to one or more nodes in the 5G network, including the 5G RAN 104. The first call setup request 116 may indicate a request to set up the call in accordance with the call requirement(s) 114. For instance, the first call setup request 116 may request the node(s) to establish a dedicated bearer, a particular type of flow (e.g., a Guaranteed Bitrate (GBR) flow), or a particular type of Protocol Data Unit (PDU) session, for the requested call, according to the call requirement(s) 114. In some cases, the first call setup request 116 includes a PDU session modification message.

Upon receiving the first call setup request 116, the 5G RAN 104 may determine that the 5G RAN 104 cannot provide services in accordance with the QoS requirements, as specified by the first call setup request 116. In particular instances, the 5G RAN 104 may lack software that would otherwise enable the 5G RAN 104 to set up the call in accordance with the call requirement(s) 114. In some examples, the requested call may be for voice services and the 5G RAN 104 may not support voice services. In some instances, the 5G RAN 104 cannot setup the specified dedicated bearer, the particular type of flow (e.g., the GBR flow), or the particular type of PDU session that can fulfill the call requirement(s) 114.

In response to the first call setup request 116, the 5G RAN 104 may transmit a rejection 118 to the session management system 108. The rejection 118 may include an indication that the 5G RAN 104 cannot accommodate the call requirement(s) 214. In some cases, the rejection 118 includes a PDU session modification rejection message.

Upon receiving the rejection 118, the session management system 108 may initiate an EPS fallback process. The EPS fallback process may include one or more functions performed by the session management system 108.

Initially, the session management system 108 may refrain from informing the policy control system 110 that the establishment of the dedicated bearer through the 5G network has failed. In some implementations, if the session management system 108 was to forward the rejection 118 to the policy control system 110, the policy control system 110 would initiate call failure. By refraining from immediately informing the policy control system 110 of the rejection, the session management system 108 can delay or prevent call failure due to the inability of the 5G RAN 104 to accommodate the call requirement(s) 114.

The session management system 108 may initiate the establishment of a dedicated bearer through the 4G network. Specifically, the session management system 108 may transmit, to the 4G RAN 106, a second call setup request 120. The second call setup request 120 may instruct the 4G RAN 106 to establish a dedicated bearer. The dedicated bearer may be associated with the 4G network.

The 4G RAN 106 may establish the dedicated bearer in response to receiving the second call setup request 120. In addition, the 4G RAN 106 may transmit a dedicated bearer confirmation message 122 to the session management system 108. The dedicated bearer confirmation message 122 may indicate that the dedicated bearer has been established by the 4G RAN 106.

Upon receiving the dedicated bearer confirmation message 122, the session management system 108 may transmit an indication of the dedicated bearer 124 to the policy control system 110. Subsequently, the policy control system 110 may perform one or more processes for setting up the call using the established dedicated bearer. These processes may include transmitting and/or receiving data from an IMS network connected to the policy control system 110. Upon setting up the call, data may be transmitted between the UE 102 and an external device via the 4G RAN 106 and the dedicated bearer.

In various implementations, a time period, which may be defined between a first time at which the session management system 108 transmits the second call setup request 120 and a second time at which the session management system 108 receives the dedicated bearer confirmation message 122, may be shorter than a predetermined time period (also referred to herein as a "predetermined time"). In certain instances in which the dedicated bearer confirmation message 122 is not received by the session management system 108 within the predetermined time period of transmitting the second call setup request 120, the session management system 108 may forward the rejection 118 to the policy control system 110, which may initiate call failure.

As a result of the signaling 100, efficient Evolved Packet System (EPS) fallback can be enabled when a 5G RAN rejects an invitation to set up a call according to requirements (e.g., QoS policies) for the call. Moreover, call failure can be prevented when the EPS fallback is available and performed successfully.

Figure 2:
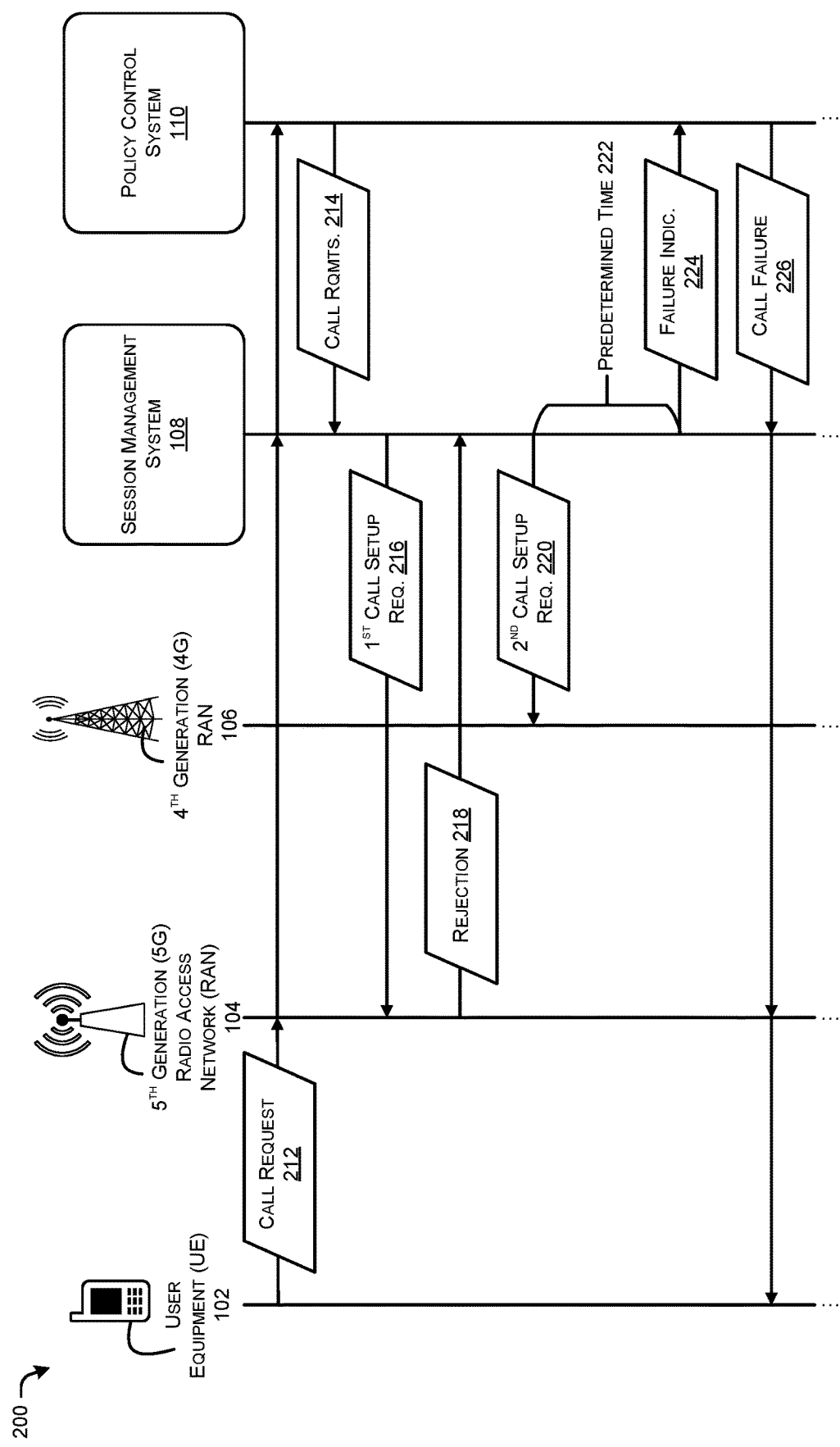

FIG. 2 is a diagram illustrating example signaling 200 between the User Equipment (UE) 102 and various components of one or more mobile networks, such as the 4th Generation (4G) mobile network and the 5th Generation (5G) mobile network, as described herein.

Prior to the signaling 200, the UE 102 may be attached to the 5G Radio Access Network (RAN) 104. In some cases, the UE 102 may be dual-connected to the 5G RAN 104 and the 4G RAN 106. In various implementations, the UE 102 may be located in a coverage area associated with the 5G RAN 104 and a coverage area associated with the 4G RAN 106 and may be capable of receiving and transmitting signals wirelessly with the 5G RAN 104 and the 4G RAN 106.

The UE 102 may transmit a call request 212 to the 5G RAN 104. While FIG. 2 illustrates an example in which the UE 102 initiates a call, in some cases, another device initiates the call with the UE 102. In particular implementations, the call request 212 may be packaged in such a way that makes it unrecognizable to the 5G RAN 104. The 5G RAN 104 may forward the call request 212 to the session management system 108 without interpreting or processing the call request 212. The session management system 108 may further forward the call request 212 to the policy control system 110.

The policy control system 110 may inspect the call request 212 and determine one or more Quality of Service (QoS) policies associated with the call request 212. The QoS policies may include any of a QoS Class Identifier (QCI), a resource type (e.g., recognizing the call as Guaranteed Bit Rate (GBR) traffic or non-GBR traffic), a priority level of the call, a packet delay budget for the call, a packet error loss rate, or any other requirement for the call. The QoS policies may be derived based on the type of services (e.g., voice services, video services, etc.) associated with the call. In some examples, the policy control system 110 may recognize that a dedicated bearer, a particular type of flow (e.g., a Guaranteed Bitrate (GBR) flow), or a particular type of Protocol Data Unit (PDU) session, should be established for the call.

The policy control system 110 may transmit one or more call requirements 214 to the session management system 108. The call requirement(s) 214 may specify various QoS requirements for the call, in some cases.

In response to receiving the call requirement(s) 214, the session management system 108 may transmit a first call setup request 216 to one or more nodes in the 5G network, including the 5G RAN 104. The first call setup request 216 may indicate a request to set up the requested call, according to the call requirement(s) 214. For instance, the first call setup request 216 may specify that the dedicated bearer, the particular type of flow, or the particular type of PDU session, should be established for the call. In some cases, the first call setup request 216 includes a PDU session modification message.

Upon receiving the first call setup request 216, the 5G RAN 104 may determine that the 5G RAN 104 cannot accommodate the call requirement(s) 214 as specified by the first call setup request 216. In particular instances, the 5G RAN 104 may lack software that would otherwise enable the 5G RAN 104 to accommodate the call requirement(s) 214. In some examples, the requested call may be for voice services and the 5G RAN 104 may not support voice services. According to some instances, the 5G RAN 104 may not be able to setup the dedicated bearer, the particular type of flow, or the particular type of PDU session to accommodate the call.

In response to the first call setup request 216, the 5G RAN 104 may transmit a rejection 218 to the session management system 108. The rejection 218 may include an indication that the 5G RAN 104 cannot set up the call. In some cases, the rejection 118 includes a PDU session modification rejection message.

Upon receiving the rejection 218, the session management system 108 may attempt to initiate an EPS fallback process. The attempt to initiate the EPS fallback process may include one or more processes.

Initially, the session management system 108 may refrain from informing the policy control system 110 that the call setup through the 5G network has failed.

The session management system 108 may initiate the establishment of a dedicated bearer through the 4G network. Specifically, the session management system 108 may transmit, to the 4G RAN 106, a second call setup request 220. The second call setup request 220 may instruct the 4G RAN 106 to establish a dedicated bearer.

In some implementations, the 4G RAN 106 may fail to establish the dedicated bearer. For example, the 4G RAN 106 or some other node in the 4G network may be malfunctioning and/or may be unable to establish the dedicated bearer. In some examples, the 4G RAN 106 may be disconnected from the 4G network.

The session management system 108 may wait a predetermined time (also referred to as a "predetermined time period") 222 after transmitting the second call setup request 220. During the predetermined time 222, the session management system 108 may refrain from receiving a dedicated bearer confirmation message (such as the dedicated bearer confirmation message 122 described above with reference to FIG. 1). In some cases, the session management system 108 may receive a rejection from the 4G RAN 106, indicating that the dedicated bearer has not been established through the 4G network. In some cases, the predetermined time 222 may expire without the session management system 108 receiving a message from the 4G RAN 106 in response to the second call setup request 220.

Upon expiration of the predetermined time 222, the session management system 108 may transmit a failure indication 224 to the policy control system 110. In some cases, the failure indication 224 may include the rejection 218, which may be forwarded from the 5G RAN 104.

In response to receiving the failure indication 224, the policy control system 110 may initiate call failure. In particular, the policy control system 110 may transmit a call failure message 226 to the 5G RAN 104, which may forward the call failure message 226 to the UE 102. In some examples, the policy control system 110 may transmit the failure indication 224 to the session management system 108, which may transmit the call failure message 226 to the UE 102 via the 5G RAN 104. Although not illustrated, the session management system 108 may transmit the call failure message 226 to a User Plane Function (UPF), which may, in turn, transmit the call failure message 226 to the 5G RAN 104. When the 5G RAN 104 receives the call failure message 226 from the UPF, the 5G RAN 104 may forward the call failure message 226 to the UE 102. The call failure message 226 may include a Session Initiation Protocol (SIP) message, such as a 503 Service Unavailable message, in some cases.

As a result of the signaling 200, Evolved Packet System (EPS) fallback can be supported, but can be timed out if the dedicated bearer cannot be established in the 4G network. Accordingly, call setup can be prevented from extending indefinitely if the dedicated bearer cannot be established within a limited time period.

Figure 3:
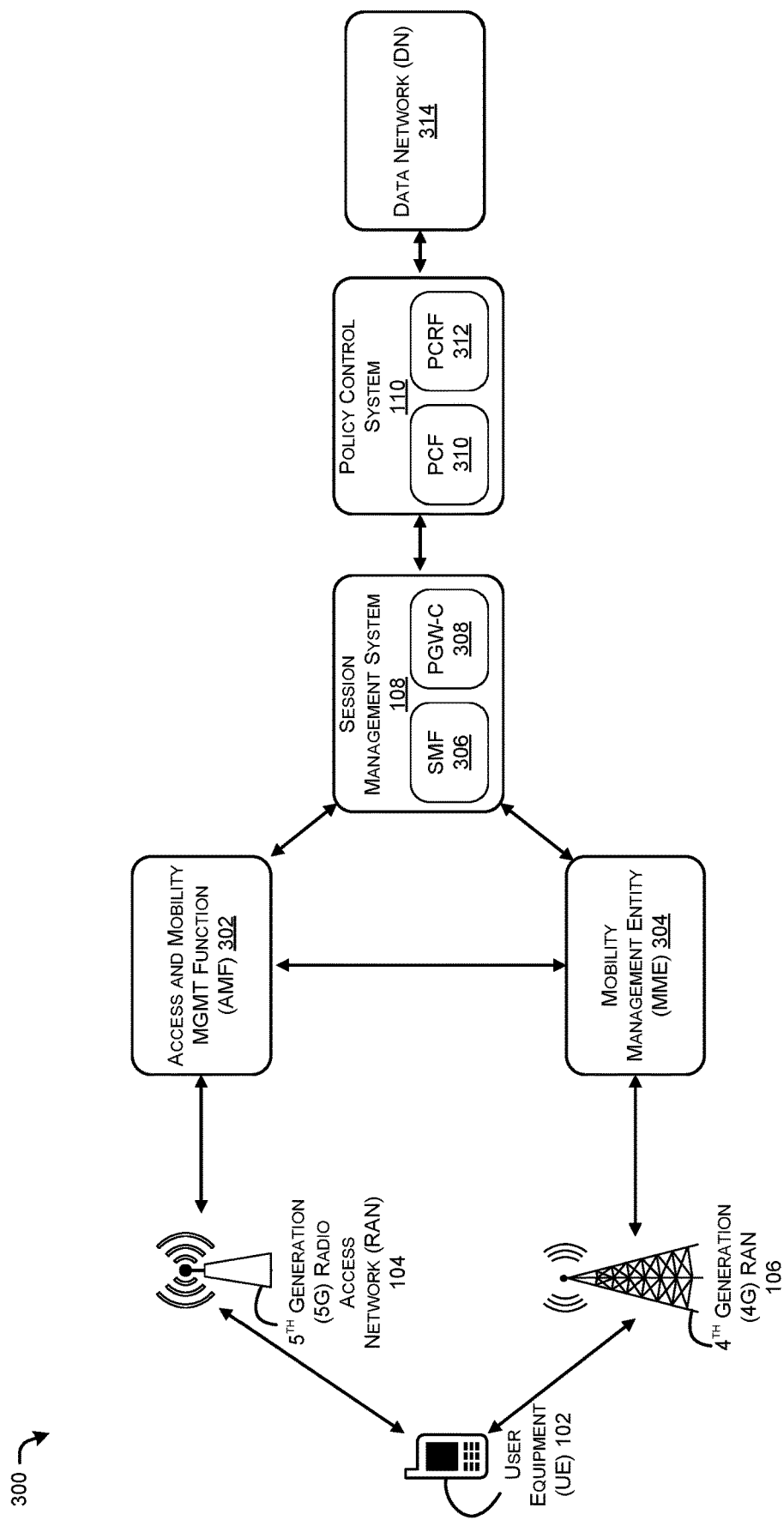
FIG. 3 illustrates an example environment implementing efficient Evolved Packet System (EPS) fallback, according to various implementations.

FIG. 3 illustrates an example environment 300 implementing efficient Evolved Packet System (EPS) fallback, according to various implementations. The environment 300 may include the User Equipment (UE) 102, the 5th Generation (5G) Radio Access Network (RAN) 104, the 4th Generation (4G) RAN 106, the session management system 108, and the policy control system 110 described above with reference to FIGS. 1 and 2.

The environment 300 may further include an Application Management Function (AMF) 302 connected between the 5G RAN 104 and the session management system 108. The AMF 302 may be part of a 5G network, along with the 5G RAN 104. In general, the AMF 302 can be implemented as a network function including functionality to provide UE-based authentication, authorization, mobility management, etc., to various UEs. In some instances, the AMF 302 can include functionality to terminate a RAN control plane interface between the UE 102 and other functions on the network. In some instances, the AMF 302 can include functionality to perform registration management of the UE 102 in a network, connection management, reachability management, mobility management, access authentication, access authorization, security anchor functionality (e.g., receiving and/or transmitting security keys during registration/authorization), and the like.

A Mobility Management Entity (MME) 304 can be connected between the 4G RAN 106 and the session management system 108, in some instances. In general, the MME 304 can be implemented as a network function that can be involved in any of activating and deactivating bearers, choosing a Serving Gateway (SGW) for a session and/or UE, choosing a Packet Data Network (PDN) Gateway (PGW) for the session and/or UE, authenticating users by interacting with a Home Subscriber Server (HSS), generating and/or allocating temporary identities to UEs, handling security key management, enforcing UE roaming restrictions, and the like. In some instances, the AMF 302 and the MME 304 can exchange data, such as control plane data.

In various implementations, the session management system 108 may include a Session Management Function (SMF) 306 and a Packet Data Network (PDN) Gateway Control plane function (PGW-C) 308. In general, the SMF can be implemented as a network function including functionality to manage communication sessions by and between UEs, and/or to provide internet protocol (IP) addresses to the UEs. In some instances, the SMF can select a User Plane Function (UPF) to provide services to the UE 102 in response to receiving a request from the UE 102. In general, the PGW-C can be implemented as a software node that handles control-plane data traffic between the 4G network and one or more external networks (e.g., an IMS network, the Internet, and the like). The PGW-C can, in particular examples, perform policy enforcement functions, charging support functions, interception functions, and the like. In certain implementations, the SMF and the PGW-C can be collocated on the same device or distributed on the same system that includes a set of devices.

The policy control system 110 may include a Policy Control Function (PCF) 310 and a Policy and Charging Rules Function (PCRF) 312. In general, the PCF can be implemented as a network function including functionality to support unified policy framework to govern network behavior, provide policy rules to control plane functions and/or enforce such rules, and/or implement a front end to access subscription information relevant for policy decisions in a data repository. In general, the PCRF can be implemented as a software node designated to determine and apply policy rules in the 4G network. In some cases, the PCRF accesses one or more subscriber databases and makes policy decisions for subscribers (e.g., UE 102) active on the 4G network. The PCRF can, in some instances, allocate network resources to particular subscribers engaged in communication sessions with particular Quality of Service (QoS) levels and charging rules.

In some examples, the 5G network may include the 5G RAN 104 and a 5G core network, which may include the SMF 306 and the PCF 310. The 4G network may include the 4G RAN 106 and a 4G core network (e.g., an Evolved Packet System (EPS)), which may include the PGW-C 308 and the PCRF 312.

The policy control system 110 may be connected to a Data Network (DN) 314. In general, the DN 314 can include any public or private network(s), such as any of the Internet, an Internet Protocol (IP) Media Subsystem (IMS) network, and the like. In addition, the DN 314 may include one or more devices that can receive and transmit data. For example, the DN 314 may include any of media server(s), user device(s), and the like.

In various implementations, a communication session (e.g., a call) may be setup between the UE 102 and an external device, such as a device connected to the DN 314. In some instances, the communication session may include the UE 102 exchanging data amounting to voice services with the DN 314.

Figure 4:
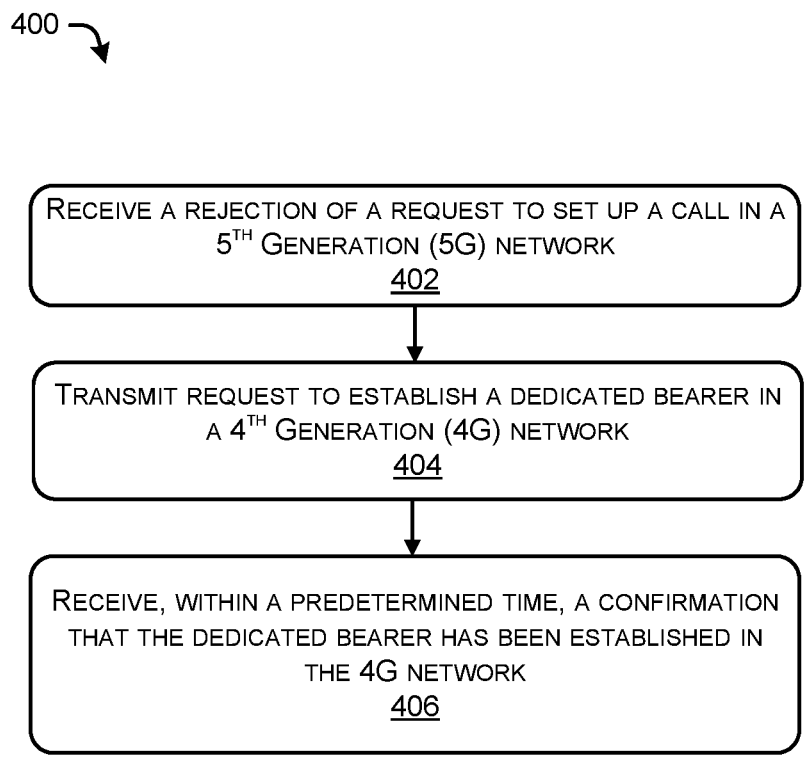
FIG. 4 illustrates an example process for efficient EPS fallback.
Figure 5:
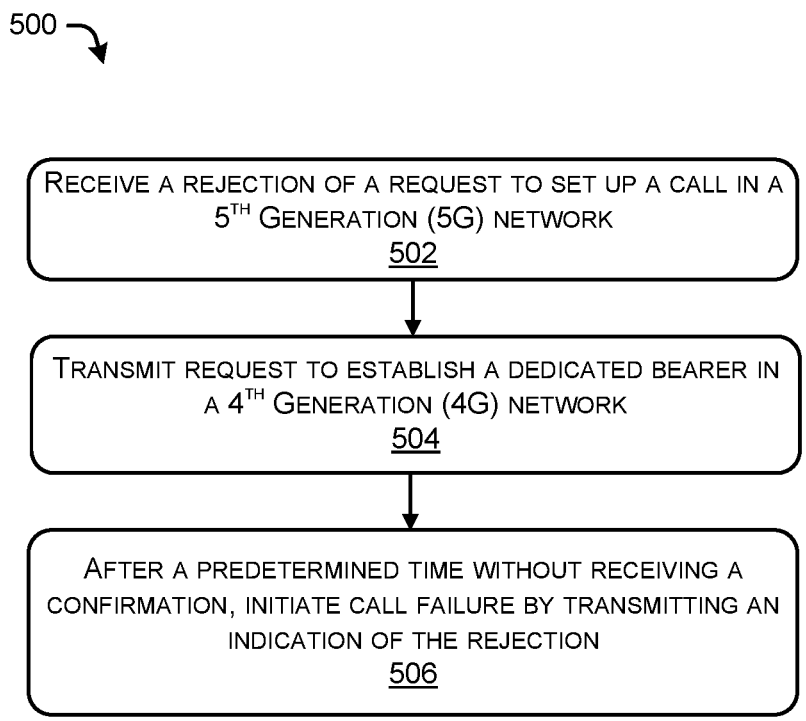
FIG. 5 illustrates an example process for implementing efficient call failure in a case of a failure to perform efficient EPS fallback.
Figure 6:
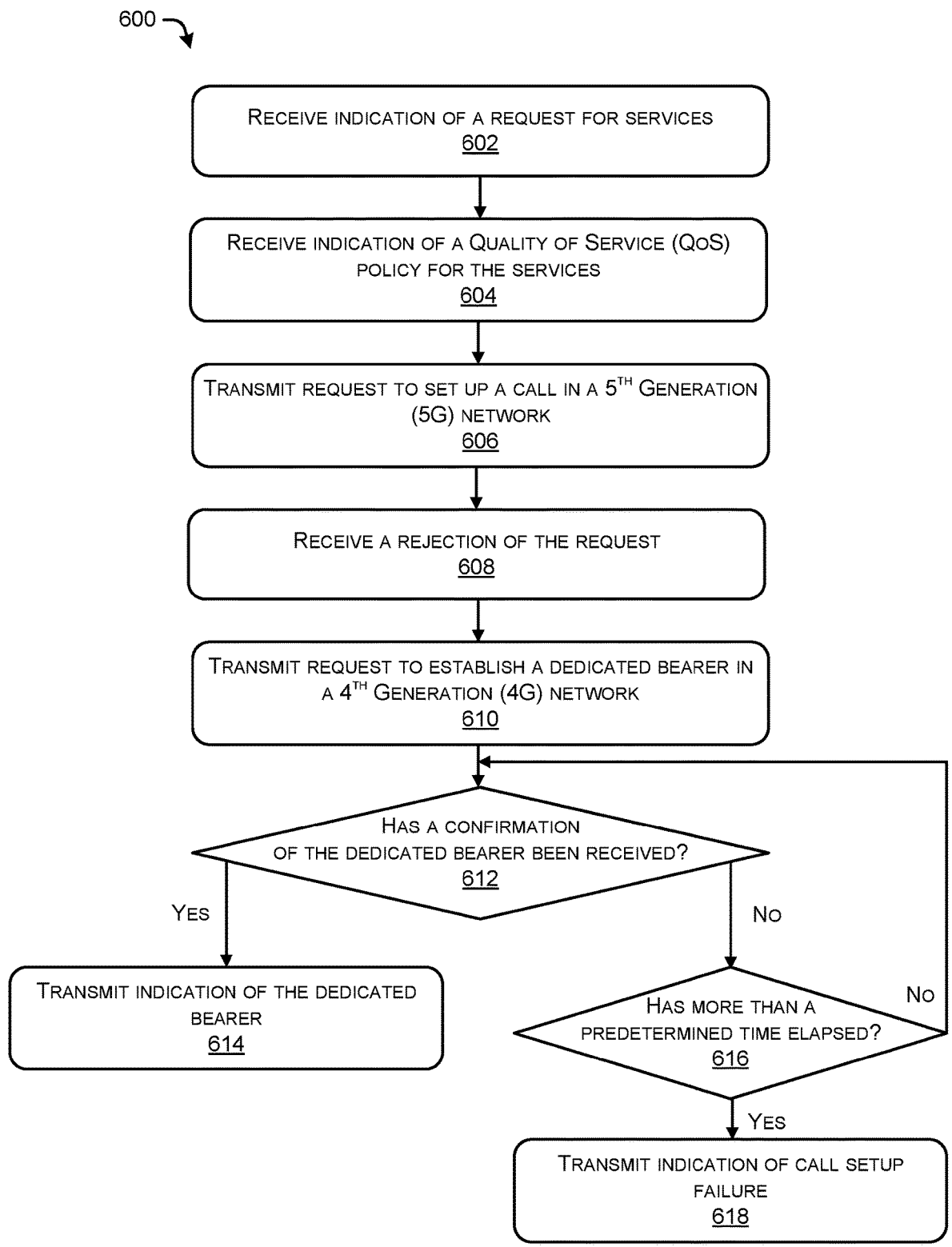
FIG. 6 illustrates an example process for implementing efficient EPS fallback.

FIGS. 4-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process 400 for efficient Evolved Packet System (EPS) fallback. In some instances, the example process 400 is performed by a session management system (e.g., the session management system 108). The session management system, in some examples, may include a Session Management Function (SMF) and a Packet Data Network (PDN) Gateway Control plane function (PGW-C).

At 402, a rejection of a request to set up a call in a 5th Generation (5G) network may be received. In particular implementations, the rejection may indicate that a 5G Radio Access Network (RAN) has rejected a request to accommodate one or more requirements of the call (e.g., a particular Quality of Service (QoS) policy, a Guaranteed Bit Rate (GPR) policy, etc.). In some examples, the rejection may indicate that the 5G RAN lacks functionality to accommodate the call through the 5G network according to the call requirement(s). For instance, the 5G RAN may lack software that would enable the 5G RAN to establish a dedicated bearer or a particular type of Protocol Data Unit (PDU) session that can accommodate the call requirement(s).

The rejection may be received from a node in the 5G network. In some examples, the rejection may be received from an AMF in the 5G network. According to some implementations, the rejection may be received over an interface between the AMF and the SMF. The AMF may be connected to the 5G RAN, in some examples.

In some implementations, 402 may occur after the request to set up the call has been transmitted to at least one node in the 5G network. For instance, the request may be transmitted to the AMF.

At 404, a request to establish a dedicated bearer in a 4th Generation (4G) network can be transmitted. In various implementations, the request may be transmitted to at least one node in the 4G network, such as a Mobility Management Entity (MME). The request may include a request to establish the dedicated bearer in a 4G RAN in the 4G network.

At 406, a confirmation that the dedicated bearer has been established in the 4G network may be received within a predetermined time. In particular implementations, the confirmation may be received from the MME. The confirmation may indicate that the dedicated bearer has been established through at least one node in the 4G network, such as the 4G RAN.

According to various implementations, the predetermined time may be measured from the transmission of the request to establish the dedicated bearer in the 4G network at 404. In particular examples, the predetermined time can be between 1 millisecond and 1 second. For instance, the predetermined time can be about 1 millisecond, 10 milliseconds, 100 milliseconds, 1 second, or the like. In some implementations, the predetermined time can be set consistently across a particular geographic region in which the 4G RAN is located. In some examples, the predetermined time may have a first length for a 4G RAN located in the Southwest United States, and a different, second length for a 4G RAN located in the Northeast United States.

According to various implementations, process 400 may enable efficient EPS fallback in circumstances in which the 5G network cannot accommodate the call requirement(s). After process 400 is executed, a User Equipment (UE) attached to the 4G RAN can receive services (e.g., voice services) from a Data Network (DN) (e.g., an Internet Protocol (IP) Media Subsystem (IMS) network) via the dedicated bearer established in the 4G network.

FIG. 5 illustrates an example process 500 for implementing efficient call failure in a case of a failure to perform efficient Evolved Packet System (EPS) fallback. In some instances, the process 500 is performed by a session management system (e.g., the session management system 108).

At 502, a rejection of a request to set up a call in a 5th Generation (5G) network may be received. In particular implementations, the rejection may indicate that a 5G Radio Access Network (RAN) has rejected a request to accommodate one or more requirements of the call (e.g., a particular Quality of Service (QoS) policy, a Guaranteed Bit Rate (GPR) policy, etc.). In some examples, the rejection may indicate that the 5G RAN lacks functionality to accommodate the call through the 5G network according to the call requirement(s). For instance, the 5G RAN may lack software that would enable the 5G RAN to establish a dedicated bearer or a particular type of Protocol Data Unit (PDU) session that can accommodate the call requirement(s).

The rejection may be received from a node in the 5G network. In some examples, the rejection may be received from an AMF in the 5G network. According to some implementations, the rejection may be received over an interface between the AMF and the SMF. The AMF may be connected to the 5G RAN, in some examples.

In some implementations, 502 may occur after the request to set up the call has been transmitted to at least one node in the 5G network. For instance, the request may be transmitted to the AMF.

At 504, a request to establish a dedicated bearer in a 4th Generation (4G) network can be transmitted. In various implementations, the request may be transmitted to at least one node in the 4G network, such as a Mobility Management Entity (MME). The request may include a request to establish the dedicated bearer in a 4G RAN in the 4G network.

At 506, after a predetermined time without receiving a confirmation, an indication of the rejection may be transmitted. In various implementations, transmitting the indication of the rejection may cause call failure. For example, the 5G network may draw down the call involving the UE by transmitting and receiving one or more messages with the UE.

The indication of the rejection may be transmitted to a policy control system, in some examples. According to some implementations, the policy control system can include a Policy Control Function (PCF) and/or a Policy and Charging Rules Function (PCRF). By informing the policy control system of the failure to establish the dedicated bearer, the policy control system may initiate a process that results in the 5G RAN delivering a call failure message to a User Equipment (UE) connected to the 5G RAN.

According to various implementations, the predetermined time may be measured from the transmission of the request to establish the dedicated bearer in the 4G network at 506. In particular examples, the predetermined time can be between 1 millisecond and 1 second. For instance, the predetermined time can be about 1 millisecond, 10 milliseconds, 100 milliseconds, 1 second, or the like. In some implementations, the predetermined time can be set consistently across a particular geographic region in which a 4G RAN in the 4G is located. The 4G RAN may be associated with a coverage area that includes a location of the UE or that is near the location of the UE. In some examples, the predetermined time may have a first length for a 4G RAN located in the Southwest United States, and a different, second length for a 4G RAN located in the Northeast United States.

According to various implementations, process 500 may enable the call to be efficiently drawn down when the 5G RAN cannot set up the call and EPS fallback fails. By waiting the predetermined time, a reasonable amount of time may be utilized to attempt to perform EPS fallback may occur, without the call setup extending indefinitely when the 4G network is unable to establish the dedicated bearer (e.g., when the 4G network is malfunctioning).

FIG. 6 illustrates an example process 600 for implementing efficient Evolved Packet System (EPS) fallback. In some examples, the process 600 can be performed by a session management system (e.g., the session management system 108).

At 602, an indication of a request for services is received. In some cases, the request for services is received as uplink data from a User Equipment (UE) connected to a 5th Generation (5G) network. For example, the request for services may be the call request 112 described above with reference to FIG. 1. In particular examples, the request for services is received as downlink data from an external network, such as an Internet Protocol (IP) Media Subsystem (IMS) network.

At 604, an indication of a Quality of Service (QoS) policy for the services is received. In some cases, the indication of the QoS policy may be received as downlink data from a policy control system (e.g., policy control system 110). The indication may be, for example, the call requirements 114 or call requirements 214 described above with reference to FIGS. 1 and 2.

At 606, a request to set up a call in the 5G network is transmitted. The call may correspond to delivery of the services specified in the request received at 602. In particular implementations, the request is transmitted to at least one node in the 5G network. For example, the request may be transmitted to an Application Management Function (AMF) in the 5G network, which the AMF can distribute to a 5G Radio Access Network (RAN) connected to the UE.

At 608, a rejection of the request to set up the call is received. In various implementations, the rejection is received from one or more nodes in the 5G network. For example, the rejection can be received from the AMF. In particular implementations, the rejection may indicate that the 5G RAN is incapable of accommodating the QoS policy. For instance, the rejection may indicate that the 5G RAN is incapable of establishing a dedicated bearer, particular type of flow (e.g., a Guaranteed Bitrate (GBR) flow), or a particular type of Protocol Data Unit (PDU) session to accommodate the QoS policy. For instance, the 5G RAN may lack functionality to establish a GBR flow that would enable the 5G RAN to accommodate the QoS policy.

At 610, a request to establish a dedicated bearer in a 4th Generation (4G) network is transmitted. In various implementations, the request is transmitted to one or more nodes in the 4G network. For instance, the request may be transmitted to a Mobility Management Entity (MME) in the 4G network. The request may include a request to establish the dedicated bearer through a 4G RAN that is connected to the UE.

At 612, the process 600 includes determining whether a confirmation of the dedicated bearer has been received. The confirmation of the dedicated bearer may be received from one or more nodes in the 4G network. In some cases, the confirmation may be received from the same node to which the request was transmitted in 610. For instance, the confirmation may be received from the MME. The confirmation of the dedicated bearer can indicate that the dedicated bearer has been established in the 4G network. The dedicated bearer may be established through at least one node in the 4G network, such as the 4G RAN.

If the confirmation of the dedicated bearer is determined to have been received at 612, the process 600 proceeds to 614. At 614, an indication of the dedicated bearer is transmitted. In various implementations, the indication is transmitted to the policy control system. Upon receiving the indication, the policy control system may finish call setup for the UE and may enable services to be delivered to the UE via the dedicated bearer in the 4G network.

If the confirmation of the dedicated bearer has not been determined to have been received at 612, the process 600 proceeds to 616. At 616, the process 600 includes determining whether more than a predetermined time has elapsed. The predetermined time may be measured from a time at which the request to establish the second dedicated bearer was transmitted at 610. In particular examples, the predetermined time can be between 1 millisecond and 1 second. For instance, the predetermined time can be about 1 millisecond, 10 milliseconds, 100 milliseconds, 1 second, or the like. In some implementations, the predetermined time can be set consistently across a particular geographic region in which a 4G RAN in the 4G network is located. The 4G RAN may be associated with a coverage area that includes a location of the UE or that is near the location of the UE. In some examples, the predetermined time may have a first length for a 4G RAN located in the Southwest United States, and a different, second length for a 4G RAN located in the Northeast United States.

If the predetermined time is determined to have not elapsed at 616, the process 600 returns back to 612. However, if the predetermined time is determined to have elapsed at 616, the process 600 proceeds to 618. At 618, an indication of call setup failure is transmitted. In various implementations, the indication of the call setup failure is transmitted to the policy control system. In some instances, the indication of the call setup failure includes the rejection received at 608. The indication of the call setup failure, for example, may be failure indication 224 described above with reference to FIG. 2.

According to various implementations, the process 600 may enable efficient EPS fallback when a dedicated bearer can be established in the 4G network, but can enable the call to be efficiently drawn down when the dedicated cannot be established in the 5G network or the 4G network.

Figure 7:
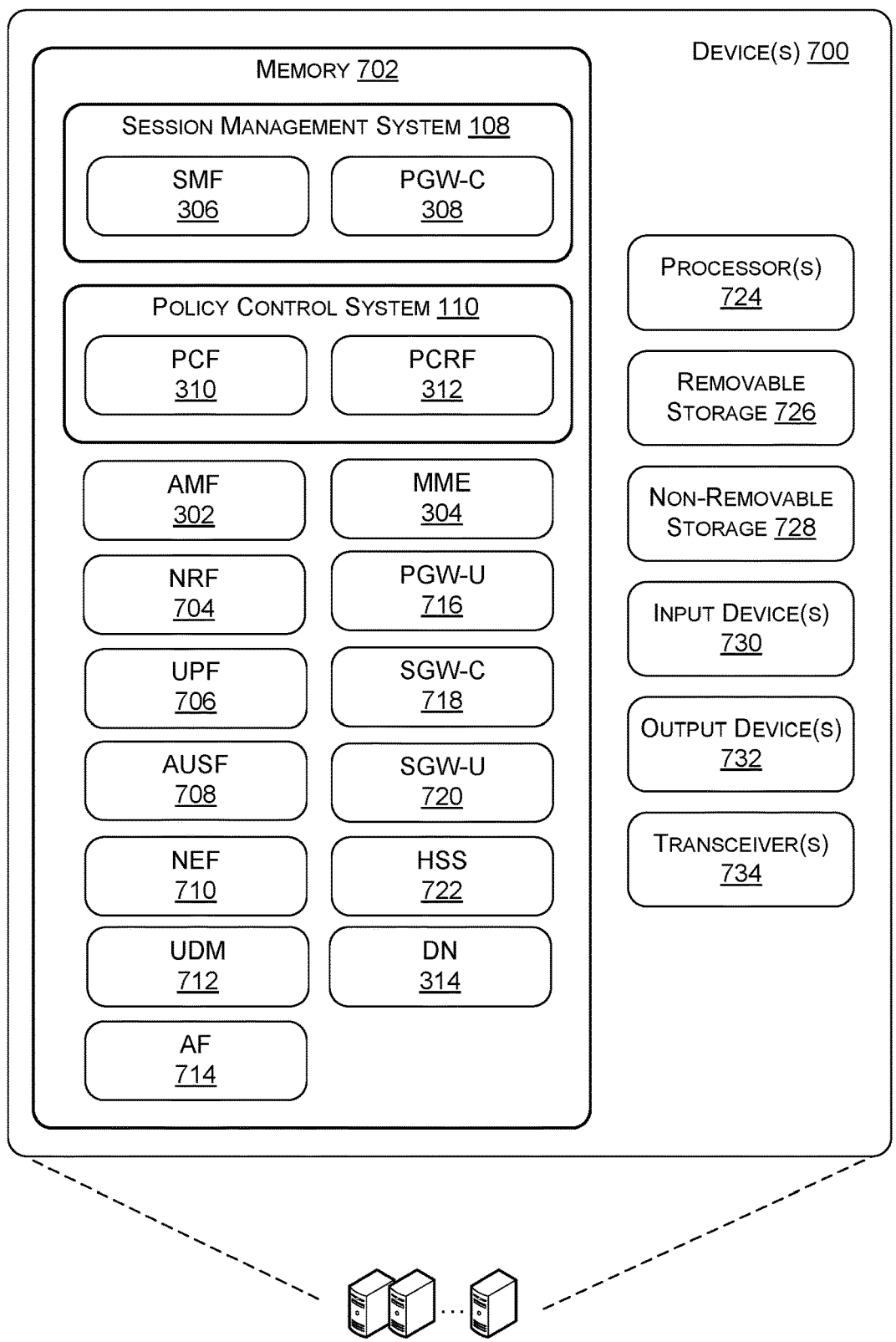
FIG. 7 illustrates example device(s) to implement efficient EPS fallback, as described herein.

FIG. 7 illustrates example device(s) 700 to implement session migration, as described herein. In some embodiments, some or all of the functionality discussed in connection with FIGS. 1-6 can be implemented in the device(s) 700. Further, the device(s) 700 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 700 can be implemented as a single device or as a plurality of devices with components and data distributed among them.

As illustrated, the device(s) 700 comprise a memory 702. The memory 702 may include the session management system 108 and the policy control system 110 described above with reference to FIGS. 1-3. As illustrated, the session management system 108 can include the Session Management Function (SMF) 306 and the Packet Data Network (PDN) Gateway Control plane function (PGW-C) 308. Further, the policy control system 110 may include the Policy Control Function (PCF) 310 and the Policy and Charging Rules Function (PCRF) 312. In addition, the memory 702 may include the Application Management Function (AMF) 302, the Mobility Management Entity (MME) 304, and the Data Network (DN) 314 described above with reference to FIG. 3.

In addition to the SMF 306, the PCF 310, and the AMF 302, the memory 702 may further include additional components of a 5th Generation (5G) network, such as any of a Network Resource Function (NRF) 704, at least one User Plane Function (UPF) 706, an Authentication Server Function (AUSF) 708, a Network Exposure Function (NEF) 710, a United Data Management (UDM) 712, and an Application Function (AF) 714. Since various functions of these 5G network components are known to those skill in the art, such details are omitted here.

In addition to the PGW-C 308, the PCRF 312, and the MME 304, the memory 702 may include additional components of a 4th Generation (4G) network, such as a PDN Gateway User plane function (PGW-U) 716, a Serving Gateway Control plane function (SGW-C) 718, a Serving Gateway User plane function (SGW-U) 720, and a Home Subscriber Service (HSS) 722.

In various embodiments, the memory 702 is volatile (such as RAM), non-volatile (such as ROM, flash memory, etc.) or some combination of the two. The session management system 108, the policy control system 110, and various other elements stored in the memory 702 can comprise methods, threads, processes, applications, or any other sort of executable instructions. The session management system 108, the policy control system 110, and various other elements stored in the memory 702 can also include files and databases.

The memory 702 may also include various instructions 724, which can be executed by processor(s) 726 to perform operations. In some embodiments, the processor(s) 726 includes a Central Processing Unit (CPU), a Graphics Processing Unit (GPU), or both CPU and GPU, or other processing unit or component known in the art.

The device(s) 700 can also include additional data storage devices (removable and/or non-removable) such as, for example, magnetic disks, optical disks, or tape. Such additional storage is illustrated in FIG. 7 by removable storage 728 and non-removable storage 730. Tangible computer-readable media can include volatile and nonvolatile, removable and non-removable media implemented in any method or technology for storage of information, such as computer readable instructions, data structures, program modules, or other data. Memory 702, removable storage 728 and non-removable storage 730 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 700. Any such tangible computer-readable media can be part of the device(s) 700.

The device(s) 700 also can include input device(s) 732, such as a keypad, a cursor control, a touch-sensitive display, voice input device, etc., and output device(s) 734 such as a display, speakers, printers, etc. These devices are well known in the art and need not be discussed at length here.

As illustrated in FIG. 7, the device(s) 700 can also include one or more wired or wireless transceiver(s) 736. For example, the transceiver(s) 736 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 736 can utilize Multiple-Input/Multiple-Output (MIMO) technology. The transceiver(s) 736 can include any sort of wireless transceivers capable of engaging in wireless, Radio Frequency (RF) communication. The transceiver(s) 736 can also include other wireless modems, such as a modem for engaging in Wi-Fi, WiMAX, Bluetooth, or infrared communication.

Example Clauses

A. A method including receiving a rejection of a request to set up a call in a first network.

B. The method of A wherein the first network is a 5th Generation (5G) network.

C. The method of A or B further including transmitting a request to establish a dedicated bearer in a second network.

D. The method of C wherein the second network is a 4th Generation (4G) network.

E. The method of C or D wherein the request to establish the dedicated bearer is transmitted in response to receiving the rejection.

F. The method of any of A to E further including waiting a predetermined time without receiving a confirmation that the dedicated bearer has been established in the second network.

G. The method of F further including causing call failure.

H. The method of F or G further including transmitting an indication of call setup failure.

I. The method of H wherein the indication of call setup failure is transmitted to a policy control system.

J. The method of I wherein the policy control system includes a Policy Control Function (PCF) of the first network.

K. The method of I or J wherein the policy control system includes a Policy and Charging Rules Function (PCRF) of the second network.

L. The method of any of A to E further including receiving a confirmation that the dedicated bearer has been established in the second network.

M. The method of L wherein the confirmation is received within a predetermined time.

N. The method of any of F to K or M wherein the predetermined time is between 1 millisecond and 1 second.

O. The method of any of F to K, M, or N wherein the predetermined time is measured from a time at which the request to establish the dedicated bearer is transmitted.

P. The method of any of A to O wherein the rejection includes a rejection of call setup in the first network by a Radio Access Network (RAN) in the first network.

Q. The method of any of A to P wherein a Protocol Data Unit (PDU) session in the first network, the dedicated bearer in the second network, or both carries data traffic between a User Equipment (UE) and a Data Network (DN).

R. The method of Q wherein the DN includes an Internet Protocol (IP) Media Subsystem (IMS) network.

S. The method of any of C to L wherein the dedicated bearer is through a 4G RAN.

T. The method of any of A to S wherein the method is performed by a session management system.

U. The method of T wherein the session management system includes a Session Management Function (SMF) of the first network.

V. The method of T or U wherein the session management system includes Packet Data Network (PDN) Gateway Control plane function (PGW-C) of the second network.

W. The method of any of A to V wherein the rejection is received from an Application Management Function (AMF) in the first network.

X. The method of any of C to W wherein the request is transmitted to a Mobility Management Entity (MME) in the second network.

Y. A method including transmitting, to an Access and Mobility Management Function (AMF), a first request to set up a call in a 5th Generation (5G) network; receiving, from the AMF, a first rejection message that indicates a rejection to the first request by a 5G Radio Access Network (RAN) connected to the AMF; in response to receiving the first rejection message, transmitting, to a Mobility Management Entity (MME), a second request to establish a first dedicated bearer through a 4th Generation (4G) network; within a predetermined time after transmitting the second request, receiving, from the MME, a confirmation that the first dedicated bearer has been established through the 4G network; and in response to receiving the confirmation, transmitting, to a policy control system, an indication that the first dedicated bearer has been established through the 4G network.

Z. A method of Y wherein the first dedicated bearer established through the 4G network carries voice services between a User Equipment (UE) connected to a 4G RAN in the 4G network and an Internet Protocol (IP) Multimedia Subsystem (IMS) network connected to the policy control system.

AA. A method of Y or Z further including transmitting, to the AMF, a third request to set up a call in the 5G network; receiving, from the AMF, a second rejection message that indicates a rejection of the third request by the 5G RAN; in response to receiving the third rejection message, transmitting, to the MME, a fourth request to establish a second dedicated bearer through the 4G network; and upon expiration of the predetermined time after transmitting the fourth request and without receiving a confirmation that the second dedicated bearer has been established, initiating call failure by transmitting an indication of the second rejection message to the policy control system.

AB: A method of any of Y to AA wherein the policy control system includes a Policy Control Function (PCF) of the 5G network and a Policy and Charging Rules Function (PCRF) of the 4G network.

AC: A method of any of Y to AB wherein the method is performed by a session management system.

AD: A method of AC wherein the session management system includes a Session Management Function (SMF) of the 5G network and a Packet Data Network (PDN) Gateway Control plane function (PGW-C) of the 4G network.

AE: A method including receiving a rejection message that indicates a rejection to set up a call through a 5th Generation (5G) network by a 5G Radio Access Network (RAN); in response to receiving the rejection message, transmitting a request to establish a dedicated bearer through a 4th Generation (4G) network; and within a predetermined time after transmitting the request, receiving a confirmation that the dedicated bearer has been established through the 4G network.

AF: The method of AE performed by a session management system.

AG: The method of AE or AF wherein the rejection message indicates that the 5G RAN lacks functionality accommodate one or more Quality of Service (QoS) policies associated with the call.

AH: The method of any of AE to AG wherein the rejection message is received from an Application Management Function (AMF) in the 5G network.

AI: The method of any of AE to AH wherein the request to establish the dedicated bearer through the 4G network is transmitted to a Mobility Management Entity (MME).

AJ: The method of any of AE to AI wherein the predetermined time is between 1 millisecond and 1 second.

AK: The method of any of AE to AJ wherein the dedicated bearer established through the 4G network carries data traffic between a User Equipment (UE) and a Data Network (DN) and includes a 4G RAN.

AL: The method of AK wherein the data traffic includes voice services and the DN includes an Internet Protocol (IP) Multimedia Subsystem (IMS) network.

AM: The method of any of AE to AL, wherein the session management system includes a Session Management Function (SMF) of the 5G network and a Packet Data Network (PDN) Gateway Control plane function (PGW-C) of the 4G network.

AN: The method of any of AE to AM further including transmitting an indication that the dedicated bearer has been established through the 4G network.

AO: The method of AN wherein the indication that the dedicated bearer has been established is transmitted to a policy control system.

AP: The method of AO wherein the policy control system includes a Policy Control Function (PCF) of the 5G network.

AQ: The method of AO or AP wherein the policy control system includes a Policy and Charging Rules Function (PCRF) of the 4G network.

AR: The method of any of A to X wherein the request to set up the call in the first network includes a Protocol Data Unit (PDU) session modification request.

AS: The method of any of A to X and AR wherein the rejection to the request to set up the call in the first network includes a Protocol Data Unit (PDU) session modification rejection.

AT: A system including at least one processor; and at least one memory storing instructions, the instructions being executable by the at least one processor to perform operations including any of methods A to AS.

AU: A non-transitory computer-readable medium storing instructions to perform any of methods A to AS.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A session management system, comprising:
   at least one processor; and
   at least one memory storing instructions, the instructions being executable by the at least one processor to perform operations comprising:
   transmitting, to an Access and Mobility Management Function (AMF) in a 5th Generation (5G) network, a first request to set up a call in the 5G network;
   receiving, from the AMF, a first rejection message that indicates a rejection of the first request by a 5G Radio Access Network (RAN) connected to the AMF;
   in response to receiving the first rejection message, transmitting, to a Mobility Management Entity (MME), a second request to establish a first dedicated bearer through a 4th Generation (4G) network; and
   after a predetermined time after transmitting the second request, transmitting an indication of a call failure to a policy control function (PCF) or a policy and charging rules function (PCRF).

2. The session management system of claim 1, wherein the first dedicated bearer is configured to carry voice services between a User Equipment (UE) connected to a 4G RAN in the 4G network and an Internet Protocol (IP) Multimedia Subsystem (IMS) network connected to a policy control system.

3. The session management system of claim 1, wherein the operations further comprise:
   transmitting, to the AMF, a third request to set up a call in the 5G network;
   receiving, from the AMF, a second rejection message that indicates a rejection of the third request by the 5G RAN;
   in response to receiving the second rejection message, transmitting, to the MME, a fourth request to establish a second dedicated bearer through the 4G network; and
   upon expiration of the predetermined time after transmitting the fourth request and without receiving a confirmation that the second dedicated bearer has been established, initiating call failure by transmitting an indication of the second rejection message to a policy control system.

4. The session management system of claim 1, wherein the session management system comprises a Session Management Function (SMF) of the 5G network and a Packet Data Network (PDN) Gateway Control plane function (PGW-C) of the 4G network, and wherein the PCF is associated with the 5G network and the PCRF is associated with the 4G network.

5. A method performed by a session management system, the method comprising:
- receiving a rejection message that indicates a rejection to set up a call in a 5th Generation (5G) network by a 5G Radio Access Network (RAN);
- in response to receiving the rejection message, transmitting a request to establish a dedicated bearer through a 4th Generation (4G) network; and
- after a predetermined time of transmitting the request, transmitting an indication of a call failure to a policy control function (PCF) or a policy and charging rules function (PCRF).

6. The method of claim 5, wherein the rejection message indicates that the 5G RAN has rejected a request to set up the call.

7. The method of claim 5, wherein the rejection message is received from an Application Management Function (AMF) in the 5G network.

8. The method of claim 5, wherein the request to establish the dedicated bearer through the 4G network is transmitted to a Mobility Management Entity (MME).

9. The method of claim 5, wherein the predetermined time is between 1 millisecond and 1 second.

10. The method of claim 5, wherein the dedicated bearer is configured to carry data traffic between a User Equipment (UE) and a Data Network (DN) and comprises a 4G RAN.

11. The method of claim 10, wherein the data traffic comprises voice services and the DN includes an Internet Protocol (IP) Multimedia Subsystem (IMS) network.

12. The method of claim 5, wherein the session management system comprises a Session Management Function (SMF) of the 5G network and a Packet Data Network (PDN) Gateway Control plane function (PGW-C) of the 4G network.

13. A system comprising:
- at least one processor; and
- at least one memory storing instructions, the instructions being executable by the at least one processor to perform operations comprising:
- receiving a rejection message that indicates a rejection to set up a call in a 5th Generation (5G) network by a 5G Radio Access Network (RAN);
- in response to receiving the rejection message, transmitting a request to establish a dedicated bearer through a 4th Generation (4G) network; and
- after a predetermined time of transmitting the request, transmitting an indication of a call failure to a policy control function (PCF) or a policy and charging rules function (PCRF).

14. The system of claim 13, wherein the rejection indicates that the 5G RAN has rejected a request to set up the call.

15. The system of claim 13, wherein the rejection is received from an Application Management Function (AMF) in the 5G network.

16. The system of claim 13, wherein the request to establish the dedicated bearer through the 4G network is transmitted to a Mobility Management Entity (MME).

17. The system of claim 13, wherein the predetermined time is between 1 millisecond and 1 second.

18. The system of claim 13, wherein the dedicated bearer is configured to carry data traffic between a User Equipment (UE) and a Data Network (DN) and is through a 4G RAN.

19. The system of claim 18, wherein the data traffic comprises voice services and the DN includes an Internet Protocol (IP) Multimedia Subsystem (IMS) network.

20. The system of claim 13, further comprising:
- a Session Management Function (SMF) of the 5G network; and
- a Packet Data Network (PDN) Gateway Control plane function (PGW-C) of the 4G network.

* * * * *